(12) United States Patent
Savoor et al.

(10) Patent No.: US 8,327,408 B2
(45) Date of Patent: Dec. 4, 2012

(54) SYSTEM AND METHOD FOR TROUBLESHOOTING A SET TOP BOX

(75) Inventors: Raghvendra Savoor, Walnut Creek, CA (US); Zhi Li, Martinez, CA (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 1043 days.

(21) Appl. No.: 11/847,120

(22) Filed: Aug. 29, 2007

(65) Prior Publication Data

US 2009/0064251 A1   Mar. 5, 2009

(51) Int. Cl.
*H04N 7/173* (2011.01)

(52) U.S. Cl. ............. 725/107; 725/9; 725/14; 725/16; 725/132; 725/140; 725/152; 715/736; 715/738; 370/241; 370/241.1; 370/242; 370/245; 370/247; 370/248; 370/249; 370/250; 370/251; 370/252; 370/253; 714/2; 714/25; 714/30; 714/36; 714/57

(58) Field of Classification Search ................ 725/9, 14, 725/16, 107, 132, 140, 152; 715/736, 738; 370/241, 241.1, 242, 245, 247–253; 714/2, 714/25, 30, 36, 46, 48, 57

See application file for complete search history.

(56) References Cited

U.S. PATENT DOCUMENTS

| | | | |
|---|---|---|---|
| 6,853,932 B1 * | 2/2005 | Wichelman et al. | 702/76 |
| 7,788,498 B2 * | 8/2010 | Yang et al. | 713/183 |
| 2002/0059619 A1 * | 5/2002 | Lebar | 725/87 |
| 2002/0141348 A1 * | 10/2002 | Swix et al. | 370/252 |
| 2003/0028891 A1 * | 2/2003 | Hardt et al. | 725/107 |
| 2004/0054771 A1 * | 3/2004 | Roe et al. | 709/224 |
| 2004/0093370 A1 * | 5/2004 | Blair et al. | 709/200 |
| 2005/0081079 A1 * | 4/2005 | Cheston et al. | 714/2 |
| 2005/0114879 A1 * | 5/2005 | Kamieniecki | 725/15 |
| 2005/0183130 A1 * | 8/2005 | Sadja et al. | 725/107 |
| 2006/0227714 A1 | 10/2006 | Griffin et al. | |
| 2006/0230312 A1 * | 10/2006 | Nichols et al. | 714/25 |
| 2007/0041554 A1 | 2/2007 | Newman et al. | |
| 2007/0050836 A1 * | 3/2007 | Stanek et al. | 725/131 |
| 2007/0100782 A1 * | 5/2007 | Reed et al. | 707/1 |
| 2007/0162932 A1 * | 7/2007 | Mickle et al. | 725/37 |
| 2007/0165818 A1 | 7/2007 | Savoor et al. | |
| 2007/0283400 A1 * | 12/2007 | Lee et al. | 725/107 |
| 2008/0022336 A1 * | 1/2008 | Howcroft et al. | 725/100 |

* cited by examiner

*Primary Examiner* — Jason Salce
(74) *Attorney, Agent, or Firm* — Guntin Meles & Gust, PLC; Andrew Gust (57) ABSTRACT

A method for troubleshooting a set top box is disclosed and can include receiving a trouble ticket from a set top box and initiating a self test at the set top box. The method can also include receiving test results from the set top box and analyzing the test results to isolate a problem.

20 Claims, 7 Drawing Sheets

SYSTEM AND METHOD FOR TROUBLESHOOTING A SET TOP BOX

FIELD OF THE DISCLOSURE

The present disclosure relates generally to managing set top boxes.

BACKGROUND

Television viewing is a popular form of entertainment. Developments in television and video technologies allow viewers to watch a wide variety of high-resolution content and to record programs to watch at a convenient time. Recent advancements, such as video-on-demand and the expansion of available channels, add to the breadth and convenience of television programming.

These advancements have resulted in set top boxes with increased functionality. However, as the functionality of a set top box increases, the potential problems with the set top box also increase. When a user experiences trouble with a set top box, the user can contact a customer service center, or repair center, to troubleshoot the set top box. Typically, the service center will send a reboot signal to the set top box in an attempt to correct the problem. Oftentimes, this is simply a stopgap measure and the problem with the set top box may not be fully corrected.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

In a particular embodiment, a method for troubleshooting a set top box is disclosed and can include receiving a trouble ticket from a set top box and initiating a self test at the set top box.

In another embodiment, a method of troubleshooting a set top box is disclosed and can include performing at least one self test at the set top box and transmitting full test results to a repair center when the at least one self test is completed.

In yet another embodiment, an IPTV receiver is disclosed and can include a processor, a memory coupled to the processor, and a computer program within the memory. The computer program can include logic to perform at least one self test at the set top box and logic to transmit full test results to a repair center when the at least one self test is completed.

Figure 1:
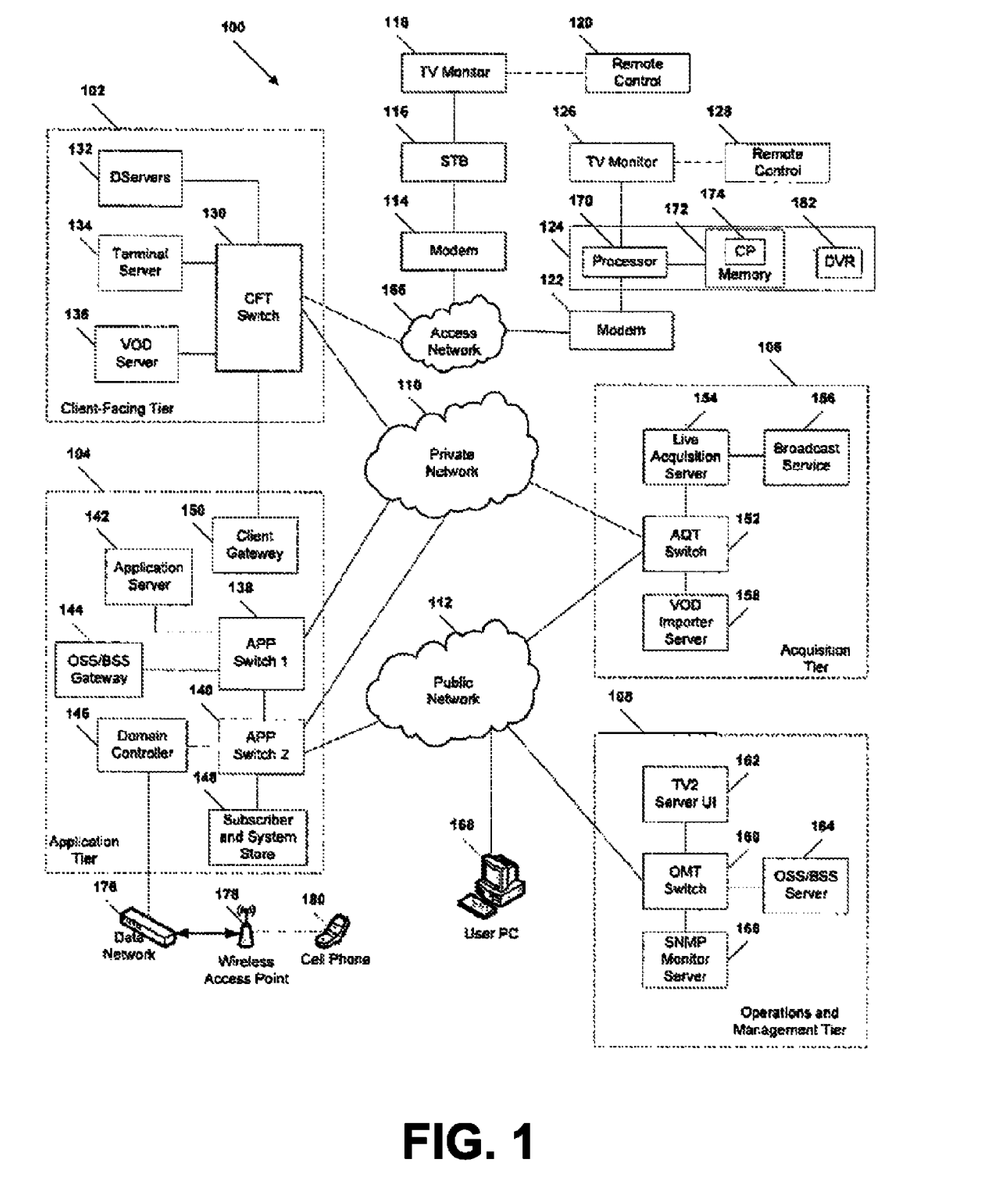
FIG. 1 is a block diagram illustrating an embodiment of an Internet protocol television (IPTV) system.

FIG. 1 shows an IPTV system 100 including a client facing tier 102, an application tier 104, an acquisition tier 106, and an operations and management tier 108. Each tier 102, 104, 106, and 108 is coupled to one or both of a private network 110 and a public network 112. For example, the client-facing tier 102 can be coupled to the private network 110, while the application tier 104 can be coupled to the private network 110 and to a public network such as the Internet. The acquisition tier 106 can also be coupled to the private network 110 and to the public network 112. Moreover, the operations and management tier 108 can be coupled to the public network 112.

The various tiers 102, 104, 106 and 108 communicate with each other via the private network 110 and the public network 112. For instance, the client-facing tier 102 can communicate with the application tier 104 and the acquisition tier 106 via the private network 110. The application tier 104 can also communicate with the acquisition tier 106 via the private network 110. Further, the application tier 104 can communicate with the acquisition tier 106 and the operations and management tier 108 via the public network 112. Moreover, the acquisition tier 106 can communicate with the operations and management tier 108 via the public network 112. In a particular embodiment, elements of the application tier 104 can communicate directly with the client-facing tier 102.

The client-facing tier 102 can communicate with user equipment via a private access network 166, such as an Internet Protocol Television (IPTV) network. In an illustrative embodiment, modems such as a first modem 114 and a second modem 122 can be coupled to the private access network 166. The client-facing tier 102 can communicate with a first representative set-top box device 116 via the first modem 114 and with a second representative set-top box device 124 via the second modem 122. The client-facing tier 102 can communicate with a large number of set-top boxes over a wide geographic area, such as a regional area, a metropolitan area, a viewing area, or any other suitable geographic area that can be supported by networking the client-facing tier 102 to numerous set-top box devices. In one embodiment, the client-facing tier 102 can be coupled to the modems 114 and 122 via fiber optic cables. Alternatively, the modems 114 and 122 can be digital subscriber line (DSL) modems that are coupled to one or more network nodes via twisted pairs, and the client-facing tier 102 can be coupled to the network nodes via fiber-optic cables. Each set-top box device 116 and 124 can process data received from the private access network 166 via an IPTV software platform such as Microsoft® TV IPTV Edition.

The first set-top box device 116 can be coupled to a first display device 118, such as a first television monitor, and the second set-top box device 124 can be coupled to a second display device 126, such as a second television monitor. Moreover, the first set-top box device 116 can communicate with a first remote control 120, and the second set-top box device can communicate with a second remote control 128. In an exemplary, non-limiting embodiment, each set-top box device 116 and 124 can receive data or video from the client-facing tier 102 via the private access network 166 and render or display the data or video at the display device 118 or 126 to which it is coupled. The set-top box devices 116 and 124 thus may include tuners that receive and decode television programming information for transmission to the display devices 118 and 126. Further, the set-top box devices 116 and 124 can include an STB processor 170 and an STB memory device 172 that is accessible to the STB processor. In a particular embodiment, the set-top box devices 116 and 124 can also communicate commands received from the remote controls 120 and 128 back to the client-facing tier 102 via the private access network 166.

In an illustrative embodiment, the client-facing tier 102 can include a client-facing tier (CFT) switch 130 that manages communication between the client-facing tier 102 and the private access network 166 and between the client-facing tier 102 and the private network 110. As shown, the CFT switch 130 is coupled to one or more data servers 132 that store data transmitted in response to user requests, such as video-on-demand material. The CFT switch 130 can also be coupled to a terminal server 134 that provides terminal devices, such as a game application server and other devices with a common connection point to the private network 110. In a particular embodiment, the CFT switch 130 can also be coupled to a video-on-demand (VOD) server 136.

The application tier 104 can communicate with both the private network 110 and the public network 112. In this embodiment, the application tier 104 can include a first application tier (APP) switch 138 and a second APP switch 140. In a particular embodiment, the first APP switch 138 can be coupled to the second APP switch 140. The first APP switch 138 can be coupled to an application server 142 and to an OSS/BSS gateway 144. The application server 142 provides applications to the set-top box devices 116 and 124 via the private access network 166, so the set-top box devices 116 and 124 can provide functions such as display, messaging, processing of IPTV data and VOD material. In a particular embodiment, the OSS/BSS gateway 144 includes operation systems and support (OSS) data, as well as billing systems and support (BSS) data.

The second APP switch 140 can be coupled to a domain controller 146 that provides web access, for example, to users via the public network 112. The second APP switch 140 can be coupled to a subscriber and system store 148 that includes account information, such as account information that is associated with users who access the system 100 via the private network 110 or the public network 112. In a particular embodiment, the application tier 104 can also include a client gateway 150 that communicates data directly to the client-facing tier 102. In this embodiment, the client gateway 150 can be coupled directly to the CFT switch 130. The client gateway 150 can provide user access to the private network 110 and the tiers coupled thereto.

In a particular embodiment, the set-top box devices 116 and 124 can access the system via the private access network 166 using information received from the client gateway 150. The private access network 166 provides security for the private network 110. User devices can access the client gateway 150 via the private access network 166, and the client gateway 150 can allow such devices to access the private network 110 once the devices are authenticated or verified. Similarly, the client gateway 150 can prevent unauthorized devices, such as hacker computers or stolen set-top box devices from accessing the private network 110, by denying access to these devices beyond the private access network 166.

For example, when the set-top box device 116 accesses the system 100 via the private access network 166, the client gateway 150 can verify subscriber information by communicating with the subscriber and system store 148 via the private network 110, the first APP switch 138 and the second APP switch 140. Further, the client gateway 150 can verify billing information and status by communicating with the OSS/BSS gateway 144 via the private network 110 and the first APP switch 138. The OSS/BSS gateway 144 can transmit a query across the first APP switch 138, to the second APP switch 140, and the second APP switch 140 can communicate the query across the public network 112 to the OSS/BSS server 164. After the client gateway 150 confirms subscriber and/or billing information, the client gateway 150 can allow the set-top box device 116 access to IPTV content and VOD content. If the client gateway 150 cannot verify subscriber information for the set-top box device 116, such as because it is connected to a different twisted pair, the client gateway 150 can deny transmissions to and from the set-top box device 116 beyond the private access network 166.

The acquisition tier 106 includes an acquisition tier (AQT) switch 152 that communicates with the private network 110. The AQT switch 152 can also communicate with the operations and management tier 108 via the public network 112. In a particular embodiment, the AQT switch 152 can be coupled to a live acquisition server 154 that receives television content, for example, from a broadcast service 156. Further, the AQT switch can be coupled to a video-on-demand importer server 158 that stores television content received at the acquisition tier 106 and communicate the stored content to the client-facing tier 102 via the private network 110.

The operations and management tier 108 can include an operations and management tier (OMT) switch 160 that conducts communication between the operations and management tier 108 and the public network 112. In the illustrated embodiment, the OMT switch 160 is coupled to a TV2 server 162. Additionally, the OMT switch 160 can be coupled to an OSS/BSS server 164 and to a simple network management protocol (SNMP) monitor 166 that monitors network devices. In a particular embodiment, the OMT switch 160 can communicate with the AQT switch 152 via the public network 112.

In a particular embodiment during operation of the IPTV system, the live acquisition server 154 can acquire television content from the broadcast service 156. The live acquisition server 154 in turn can transmit the television content to the AQT switch 152 and the AQT switch can transmit the television content to the CFT switch 130 via the private network 110. Further, the television content can be encoded at the D-servers 132, and the CFT switch 130 can communicate the television content to the modems 114 and 122 via the private access network 166. The set-top box devices 116 and 124 can receive the television content from the modems 114 and 122, decode the television content, and transmit the content to the display devices 118 and 126 according to commands from the remote control devices 120 and 128.

Additionally, at the acquisition tier 106, the video-on-demand (VOD) importer server 158 can receive content from one or more VOD sources outside the IPTV system 100, such as movie studios and programmers of non-live content. The VOD importer server 158 can transmit the VOD content to the AQT switch 152, and the AQT switch 152 in turn can communicate the material to the CFT switch 130 via the private network 110. The VOD content can be stored at one or more servers, such as the VOD server 136.

When a user issues a request for VOD content to the set-top box device 116 or 124, the request can be transmitted over the private access network 166 to the VOD server 136 via the CFT switch 130. Upon receiving such a request, the VOD server 136 can retrieve requested VOD content and transmit the content to the set-top box device 116 or 124 across the private access network 166 via the CFT switch 130. In an illustrative embodiment, the live acquisition server 154 can transmit the television content to the AQT switch 152, and the AQT switch 152 in turn can transmit the television content to the OMT switch 160 via the public network 112. In this embodiment, the OMT switch 160 can transmit the television content to the TV2 server 162 for display to users accessing the user interface at the TV2 server. For example, a user can access the TV2 server 162 using a personal computer 168 coupled to the public network 112.

The domain controller 146 communicates with the public network 112 via the second APP switch 140. Additionally, the domain controller 146 can communicate via the public network 112 with the personal computer 168. For example, the domain controller 146 can display a web portal via the public network 112 and allow users to access the web portal using the PC 168. Further, in an illustrative embodiment, the domain controller 146 can communicate with at least one wireless network access point 178 over a data network 176. In this embodiment, each wireless network access device 178 can communicate with user wireless devices such as a cellular telephone 180.

In a particular embodiment, the set-top box devices can include an STB computer program 174 that is embedded within the STB memory device 172. The STB computer program 174 can contain instructions to receive and execute at least one user television viewing preference that a user has entered by accessing an Internet user account via the domain controller 146. For example, the user can use the PC 168 to access a web portal maintained by the domain controller 146 via the Internet. The domain controller 146 can query the subscriber and system store 148 via the private network 110 for account information associated with the user. In a particular embodiment, the account information can associate the user's Internet account with the second set-top box device 124. For instance, in an illustrative embodiment, the account information can relate the user's account to the second set-top box device 124 by associating the user account with an IP address of the second set-top box device, with data relating to one or more twisted pairs connected with the second set-top box device, with data related to one or more fiber optic cables connected with the second set-top box device, with an alpha-numeric identifier of the second set-top box device, with any other data that is suitable for associating second set-top box device with a user account, or with any combination of these. Further details of the IPTV system are taught in U.S. Patent Application Publication No. 2007/0083895, the disclosure of which is hereby incorporated by reference.

Figure 2:
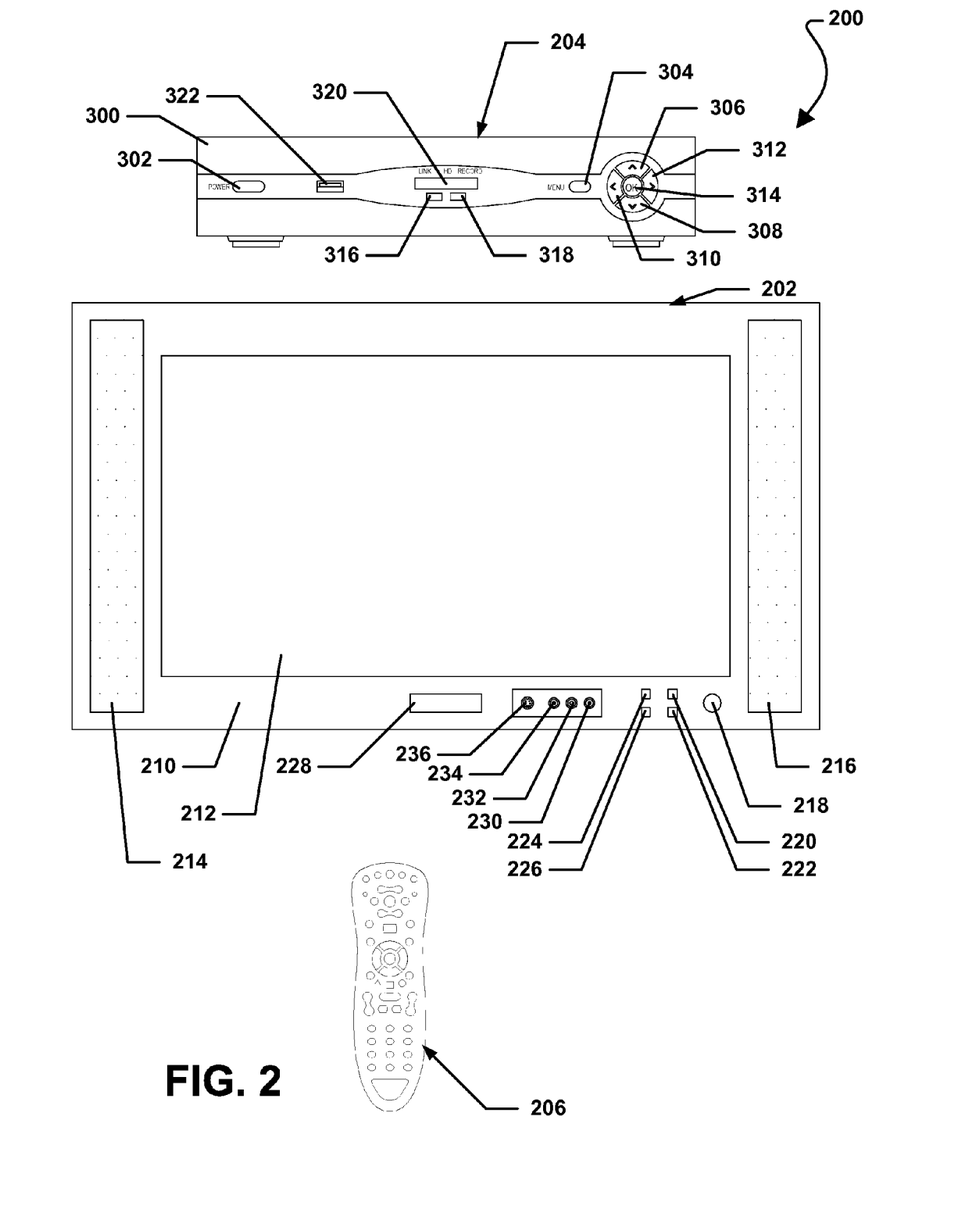
FIG. 2 is a front plan view of a video monitoring system.

FIG. 2 shows a video system 200 that can be used in conjunction with the system 100 above. The video system 200 can include a display device 202, an IPTV receiver set top box 204, and a remote control device 206. In a particular embodiment, the display device 202 can be a television. The display device 202 can include a front panel 210 in which a display screen 212 is incorporated. The front panel 210 can also include a first speaker 214 and a second speaker 216. Moreover, the front panel 210 can include a power button 218, a channel up button 220, a channel down button 222, a volume up button 224, and a volume down button 226.

The display device 202 can include a receiver 228 incorporated therein. The receiver 228 can be an infrared (IR) receiver, a radio frequency (RF) receiver, or a similar receiver. FIG. 2 also indicates that the front panel 210 of the display device 202 can include a right channel RCA connector 230, a left channel RCA connector 232, and a composite video RCA connector 234. Additionally, the front panel 210 can include an S-video connector 236.

Figure 3:
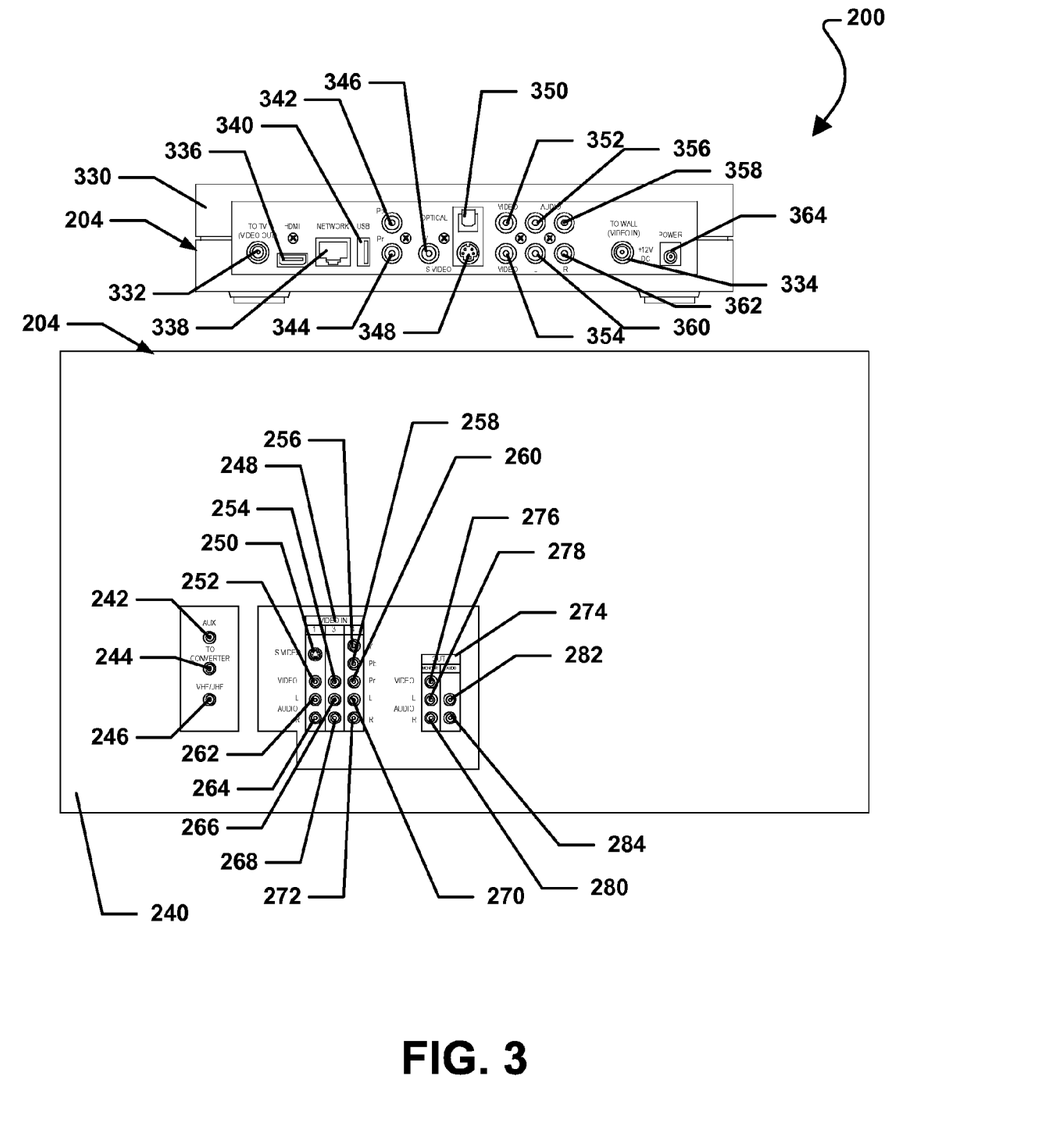
FIG. 3 is a rear plan view of the video monitoring system.

FIG. 3 shows that the display device 202 can also include a rear panel 240. The rear panel 240 can include a plurality of connectors incorporated therein. For example, the rear panel 240 of the display device 202 can include a first RF connector 242, a second RF connector 244, and a third RF connector 246. The rear panel 240 can also include a video in panel 248. The video in panel 248 can include an S-video connector 250, a first composite video RCA connector 252, and a second composite video RCA connector 254. The video in panel 248 can also include a Y component RCA connector 256, a Pb component RCA connector 258, and a Pr component RCA connector 260. Further, the video in panel 248 can include a first left channel RCA connector 262, a first right channel RCA connector 264, a second left channel RCA connector 266, a second right channel RCA connector 268, a third left channel RCA connector 270, and a third right channel RCA connector 272.

The rear panel 240 can include a video out panel 274. The video out panel 274 can include a composite video RCA connector 276, a first left channel RCA connector 278, a first right channel RCA connector 280, a second left channel RCA connector 282, and a second right channel RCA connector 284.

FIG. 2 shows that the IPTV receiver 204 can include a front panel 300. The front panel 300 of the IPTV receiver 204 can include a power button 302, a menu button 304, an up button 306, a down button 308, a left button 310, a right button 312, and an ok button 314. The front panel 300 of the IPTV receiver 204 can also include a transmitter 316 and a receiver 318 incorporated therein. In a particular embodiment, the transmitter 316 can be an IR transmitter, a RF transmitter, or a similar transmitter. Further, the receiver 318 can be an IR receiver, a RF receiver, or a similar receiver. FIG. 2 also indicates that the front panel 300 of the IPTV receiver 204 can include a display 320 and a universal serial bus (USB) connector 322. The display 320 can be a light emitting diode (LED) display, a liquid crystal display (LCD), or some other display.

FIG. 3 shows that the IPTV receiver 204 can include a rear panel 330. The rear panel 330 of the IPTV receiver 204 can include a first RF connector 332 and a second RF connector 334. Further, the rear panel 330 of the IPTV receiver 204 can include a high definition multi-media interface (HDMI) connector 336, a network connection 338, and a USB connection 340. In a particular embodiment, the network connection 338 can be an RJ-45 port. The network connection 338 can allow the IPTV receiver 204 to be connected to an IPTV network via an Ethernet cable.

The rear panel 330 of the IPTV receiver 204 can also include a Pb component RCA connector 342, a Pr component RCA connector 344, and a Y component RCA connector 346. The rear panel 330 can include an S-video connector 348 and an optical video connector 350. Additionally, the rear panel 330 of the IPTV receiver 204 can include a first composite video RCA connector 352, and a second composite video RCA connector 354. Further, the rear panel 330 of the IPTV receiver 204 can include a first left channel RCA connector 356, a first right channel RCA connector 358, a second left channel RCA connector 360, and a second right channel RCA connector 362. The rear panel 330 of the IPTV receiver 204 can also include a power input connector 364.

Figure 4:
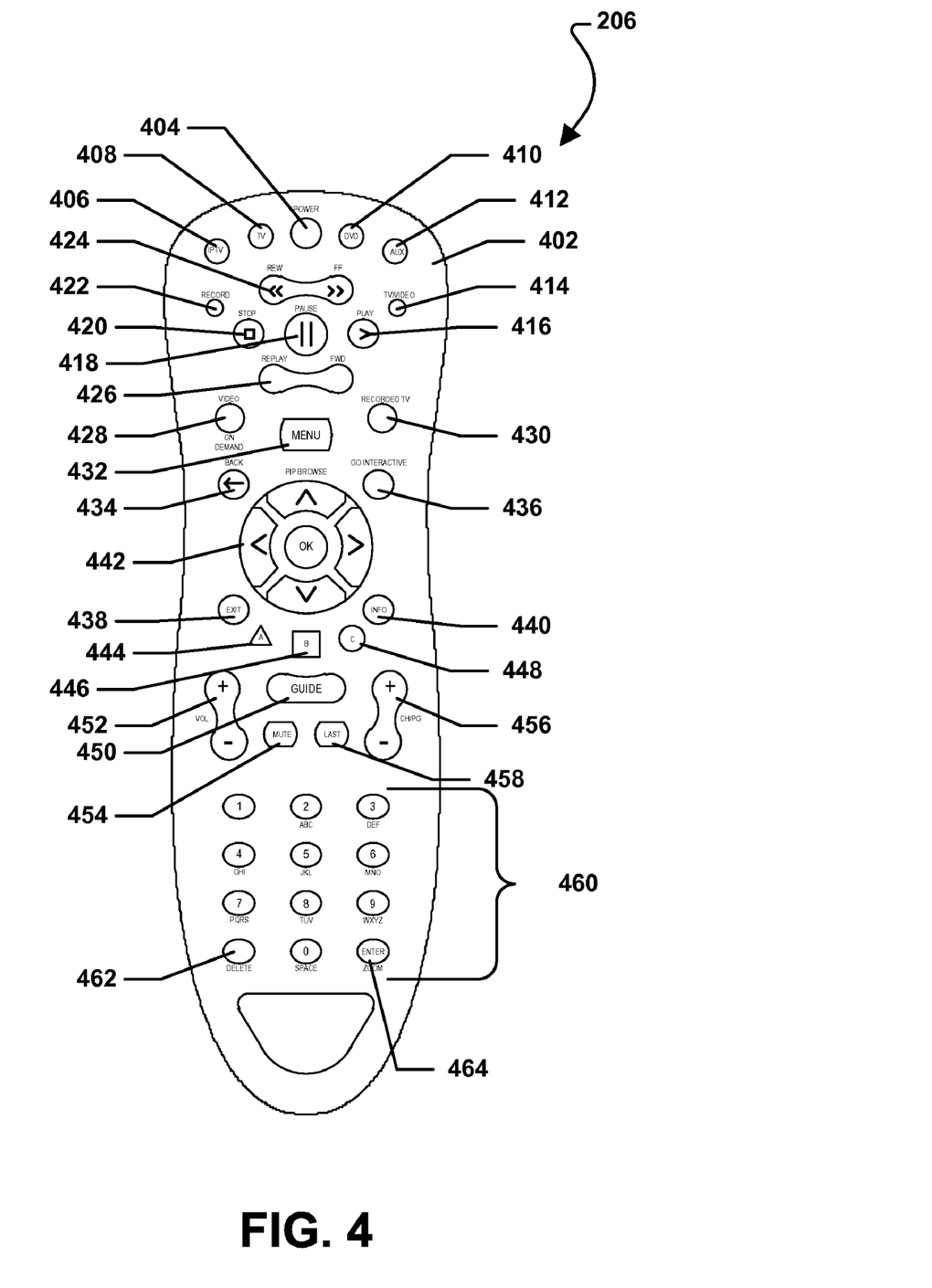
FIG. 4 is a plan view of a remote control device.

FIG. 4 shows details concerning the remote control device 206. The remote control device 206 can include a housing 402 having a plurality of buttons. For example, the remote control device 206 can include a power button 404, an IPTV button 406, a television (TV) button 408, a digital video disc (DVD) button 410, and an auxiliary (AUX) button 412. When the IPTV button 406 is pressed, the remote control device 206 can be used to control an IPTV receiver. When the TV button 408 is pressed, the remote control device 406 can be used to control a TV connected to the IPTV receiver. When the DVD button 410 is pressed, the remote control device 206 can be used to control a DVD player connected to the TV, the IPTV receiver, or both. Additionally, when the AUX button 412 is pressed, the remote control device 206 can be used to control an auxiliary device connected to the TV, the IPTV receiver, or both. For example, the auxiliary device can be a compact disc (CD) player, a video cassette recorder (VCR), an audio receiver, or some other home entertainment device.

The remote control device 206 can include a TV/VIDEO button 414 that can be used to toggle between television content and video content, e.g., from a DVD player. The remote control device 206 can also include a PLAY button 416, a PAUSE button 418, a STOP button 420, a RECORD button 422, a rewind (REW)/fast forward (FF) button 424, and a replay/slow forward (FWD) button 426. These buttons can be used to control the content received at the IPTV receiver or video content received from a DVD player. One or more of these buttons can also be programmed to control a CD player, a VCR, or some other home entertainment device.

The remote control device 206 can also include a VIDEO ON DEMAND button 428 and a RECORDED TV button 430. The VIDEO ON DEMAND button 428 can be pressed in order to access on demand video content available via the IPTV receiver. The RECORDED TV button 430 can be pressed in order to access television content recorded at the IPTV receiver.

The remote control device 206 can also include a MENU button 432, a BACK button 434, a GO INTERACTIVE button 436, an EXIT button 438, and an INFO button 440. The MENU button 432 can be used to access a menu of features provided by the IPTV receiver. Further, the INFO button 440 can be used to access an information window provided by the IPTV receiver. The GO INTERACTIVE button 436 can be used to access interactive content provided by the IPTV system. FIG. 4 also shows that the remote control device 206 can include a directional keypad 442. The directional keypad 442, the BACK button 434, and the EXIT button 438 can be used to navigate within the various content windows provided by the IPTV receiver. The remote control device 206 can also include a triangular A button 444, a square B button 446, and a round C button 448. The A button 444, the B button 446, and the C button 448 can be used to make various selections when navigating within a menu screen, an information screen, or some other screen provided by the IPTV receiver.

The remote control device 206 can further include a GUIDE button 450 that can be pressed in order to access a guide for the content provided by the IPTV receiver. Moreover, the remote control device 206 can include a volume (VOL) up/down button 452, a MUTE button 454, a channel/page (CH/PG) up/down button 456, and a LAST button 458. The VOL button 452 can be used to control the volume of an IPTV receiver, a TV, a CD player, etc. The MUTE button 454 can be used to mute audio content provided by an IPTV receiver, a TV, a CD player, etc. The CH/PG button 456 can be used to change the channel at an IPTV receiver or navigate from page-to-page within a content guide provided by an IPTV receiver. The LAST button 458 can be used to return to the last channel viewed by the user at the IPTV receiver.

The remote control device 206 can include a numerical keypad 460 having a plurality of buttons that are individually numbered 1, 2, 3, 4, 5, 6, 7, 8, 9, and 0. The numerical keypad 460 is configured similar to a telephone keypad and each individual button also includes a portion of the alphabet. The 2 button includes ABC, the 3 button includes DEF, the 4 button includes GHI, the 5 button includes JKL, the 6 button includes MNO, the 7 button includes PQRS, the 8 button includes TUV, and the 9 button includes WXYZ. The 0 button can also be used as a SPACE button. In a particular embodiment, the numerical keypad 460 can be used to input a specific channel number. Further, the numerical keypad 460 can be used to input text to the IPTV system, when necessary, using the triple tap method well known in the art. The numerical keypad 460 can also include a DELETE button 462 and an ENTER/ZOOM button 464.

Figure 5:
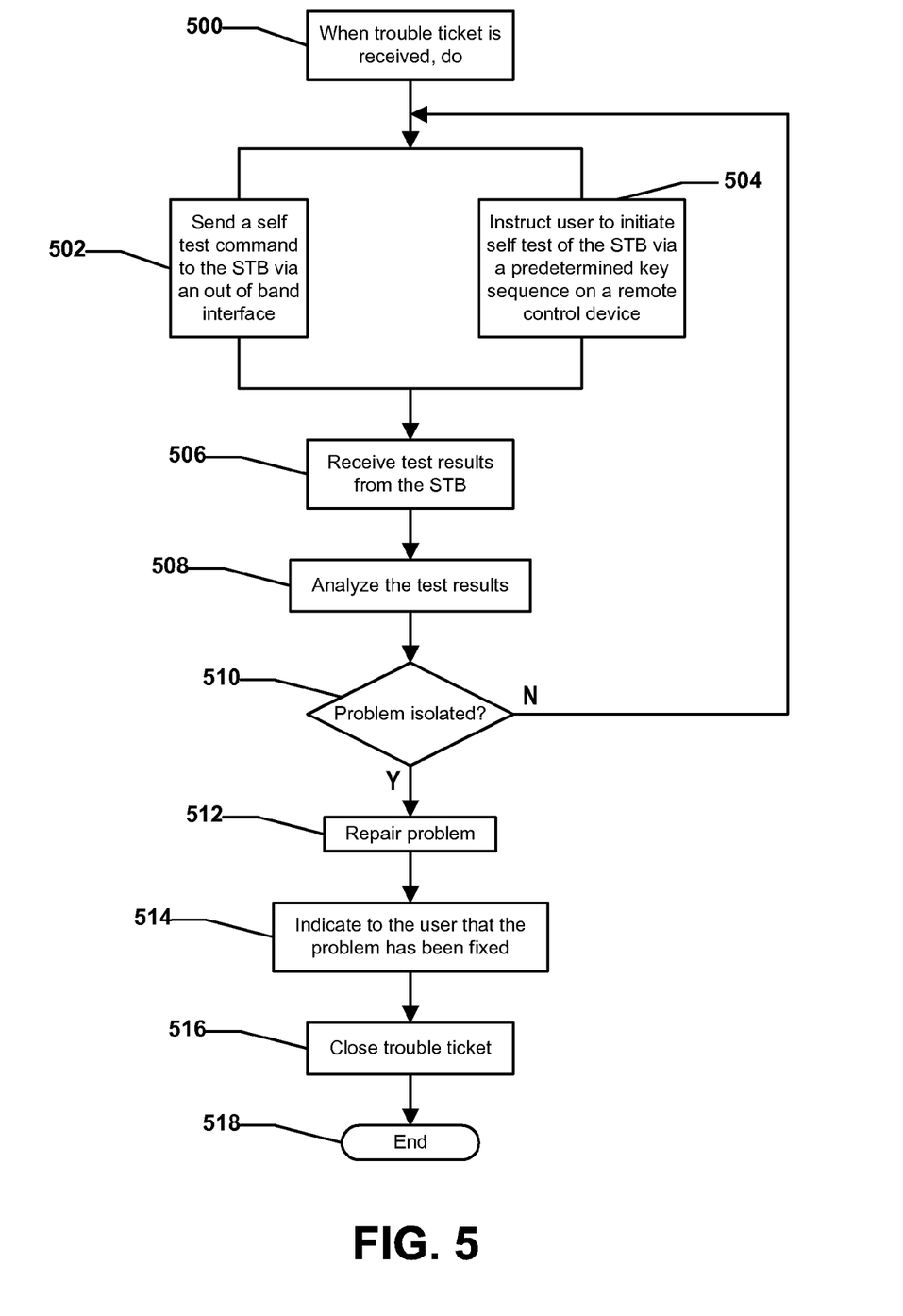
FIG. 5 is a flow chart illustrating a method of troubleshooting a set top box from a repair center.

FIG. 5 shows a method of troubleshooting a set top box from a repair center is shown and commences at block 500. At block 500, when a trouble ticket is received at a repair center, a do loop is entered and the following steps are performed. At blocks 502 and 504, a self test at the set top box can be initiated. For example, at block 502, a self test command can be sent to the set top box via an out of band interface. Alternatively, at block 504, the user can be instructed to initiate a self test of the set top box via a predetermined key sequence on a remote control device.

Moving to block 506, the test results from the set top box can be received at the repair center. At block 508, the test results can be analyzed. Further at decision step 510, it can be determined whether the problem with the set top box is isolated. If not, the method can return to block 502/504 and continue as described herein. If the problem at the set top box is isolated, the method can move to block 512 and the problem can be repair. At block 514, the repair center can indicate to the user that the problem has been fixed. Further, at block 516, the trouble ticket can be closed. The method can then end at state 518.

Figure 6:
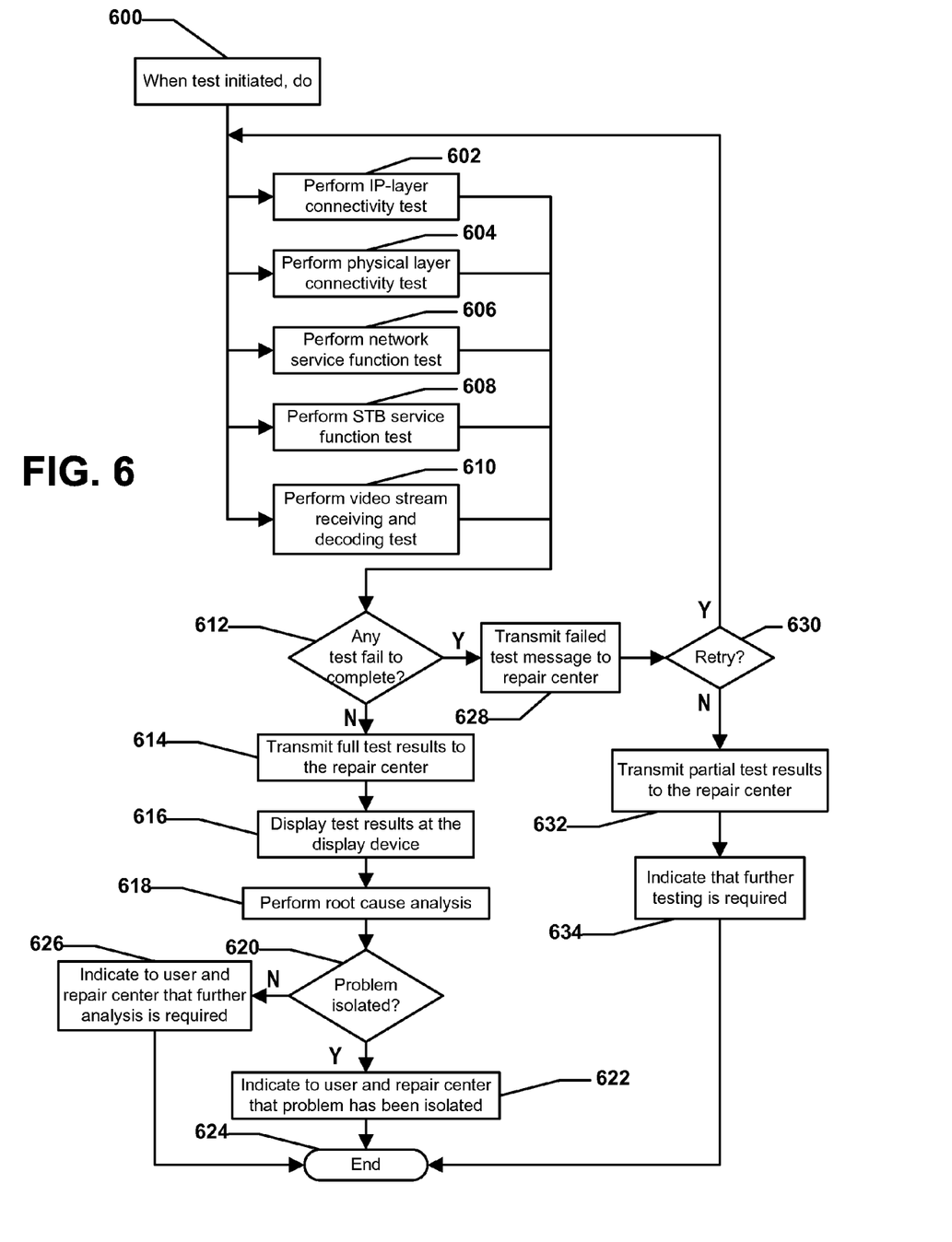
FIG. 6 is a flow chart illustrating a method of troubleshooting a set top box at the set top box.

FIG. 6 illustrates a method of troubleshooting a set top box at the set top box. Beginning at block 600, when a self test is initiated, the set top box can perform a series of self tests. For example, at block 602, the set top box can perform an IP-layer connectivity test. The IP-layer connectivity test can be a trace route, or ping, test that can be used to test the network connectivity. At block 604, the set top box can perform a physical layer connectivity test. This test can include state information and error performance information in the home network from the set top box to a residential gateway or a network interface device (NID) over an Ethernet, an HPNA, etc. At block 606, the set top box can perform a network service function test. The network service function test can include a DNS service test, a DHCP service test, another network service test, or a combination thereof.

Moreover, at block 608, the set top box can perform a set top box service function test. The set top box service function test can include testing the channel change function of the set top box, testing the electronic program guide (EPG) at the set top box, testing video on demand (VOD) functionality, etc. The set top box function tests can also include detecting settings at the set top box, e.g., parental controls, password control, etc. Further, the set top box function tests can include testing power settings, IR remote control etc. At block 610, the set top box can perform a video stream receiving and decoding test. This test can include testing analyzing video delivery and decoding at the set top box. Further, this test can include analyzing received video packets, video frame performance (e.g., I-frame loss), video decoding buffer overflow/under-flow, MPEG2 PCR jitter, latency, packet delivery rate, discontinuity, etc.

Proceeding to decision step 612, the set top box can determine whether any of the series of self tests has failed to complete. If none of the tests fail, the method can move to block 614 and the full test results can be transmitted to the repair center, or some other remote location. The test results can be transmitted to the repair center through an in-band interface or an out of band interface. For example, if video service channel has network connection issues, the set top box can upload, or report, performance data through secondary wireless channels, e.g., Wimax, WiFi, etc. At block 616, the set top box can display the test results at a display device coupled to the set top box. A customer service representative, or technician, can use the test results in an attempt to fix, or repair, the problem.

Moving to block 618, the set top box can perform a root cause analysis in order to isolate the problem. At decision step 620, the set top box can determine whether the problem is isolated. If so, the method can proceed to block 622 and the set top box can indicate to the user and to the repair center that the problem has been isolated. The method can then end at state 624.

Returning to decision step 620, if the problem is not isolated, the method can move to block 626 and the set top box can indicate to the user and the repair center that further analysis is required. The method can then end at state 624.

Returning now to decision step 612, if any test fails to complete, the method can move to block 628 and the set top box can transmit a failed test message to the repair center. Thereafter, at decision step 630, it can be determined whether to retry the failed test. This determination can be based on a request from the repair center, i.e., the repair center can request that the set top box repeat the failed test. If the set top box determines to repeat the failed test, the method can return to blocks 602 through 610 and repeat the failed test, or tests. Conversely, if the set top box determines not to repeat the failed test, the method can move to block 632 and the set top box can transmit the partial test results to the repair center. Thereafter, the set top box can indicate to the user that further testing is required. The method can then at state 624.

Figure 7:
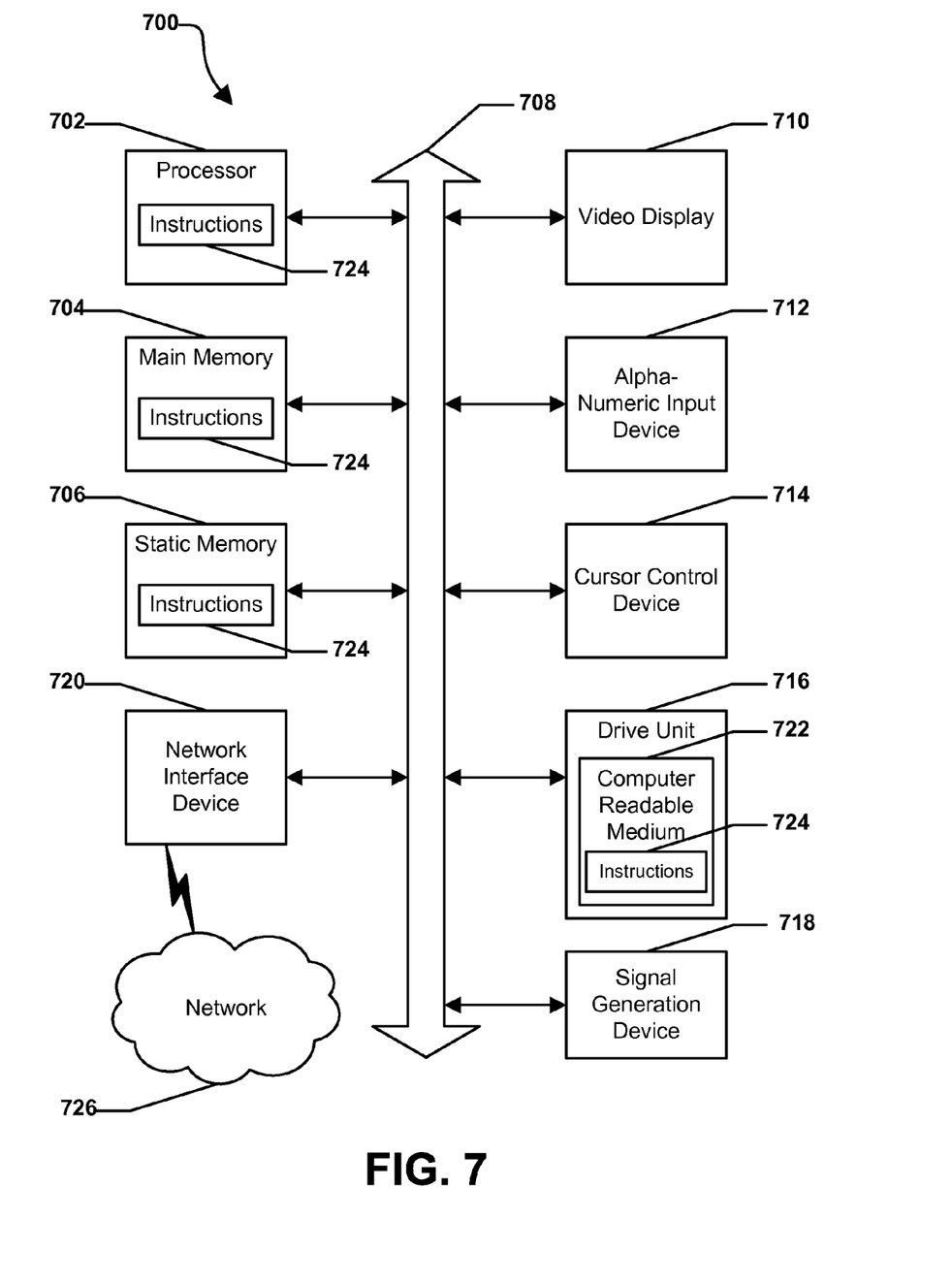
FIG. 7 is a block diagram of an illustrative embodiment of a general computer system.

Referring to FIG. 7, an illustrative embodiment of a general computer system is shown and is designated 700. The computer system 700 can include a set of instructions that can be executed to cause the computer system 700 to perform any one or more of the methods or computer based functions disclosed herein. The computer system 700 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 700 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 700 can be implemented using electronic devices that provide voice, video or data communication. Further, while a single computer system 700 is illustrated, the term "system" shall also be taken to include any collection of systems or sub-systems that individually or jointly execute a set, or multiple sets, of instructions to perform one or more computer functions.

As illustrated in FIG. 7, the computer system 700 may include a processor 702, e.g., a central processing unit (CPU), a graphics processing unit (GPU), or both. Moreover, the computer system 700 can include a main memory 704 and a static memory 706 that can communicate with each other via a bus 708. As shown, the computer system 700 may further include a video display unit 710, such as a liquid crystal display (LCD), an organic light emitting diode (OLED), a flat panel display, a solid state display, or a cathode ray tube (CRT). Additionally, the computer system 700 may include an input device 712, such as a keyboard, and a cursor control device 714, such as a mouse. The computer system 700 can also include a disk drive unit 716, a signal generation device 718, such as a speaker or remote control, and a network interface device 720.

In a particular embodiment, as depicted in FIG. 7, the disk drive unit 716 may include a computer-readable medium 722 in which one or more sets of instructions 724, e.g. software, can be embedded. Further, the instructions 724 may embody one or more of the methods or logic as described herein. In a particular embodiment, the instructions 724 may reside completely, or at least partially, within the main memory 704, the static memory 706, and/or within the processor 702 during execution by the computer system 700. The main memory 704 and the processor 702 also may include computer-readable media. The network interface device 720 can provide connectivity to a network 726, e.g., a wide area network (WAN), a local area network (LAN), or other network.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 724 or receives and executes instructions 724 responsive to a propagated signal, so that a device connected to a network 726 can communicate voice, video or data over the network 726. Further, the instructions 724 may be transmitted or received over the network 726 via the network interface device 720.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

CONCLUSION

With the configuration of structure described herein, one or more embodiments herein provide a way to troubleshoot a set top box. For example, the set top box can perform a self test and report the results of the self test to a repair center. The set top box can analyze the test results and attempt to determine the cause of the problem. Alternatively, the repair center can analyze the test results and attempt to determine the cause of the problem. During the self test, the results thereof can be displayed at a display device coupled to the set top box. As such, a technician at a customer premises can view the results of the self test and use the results of the self test in an attempt to fix the problem with the set top box. Additionally, embodiments herein can substantially reduce the costs associated with troubleshooting and repairing problems associated with set top boxes.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGs. are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A method of troubleshooting a set top box, the method comprising:
    providing a trouble notice to a repair center from the set top box;
    providing instructions to be displayed at a display device coupled to the set top box in association with the trouble notice being provided to the repair center, wherein the instructions comprise a sequence of key strokes to be entered by the user on a remote controller in communication with the set top box;
    performing at least one self test at the set top box when the sequence of key strokes is detected as being entered by the user at the remote controller;
    transmitting from the set top box, full test results to the repair center for analysis by a technician when the at least one self test is completed; and
    displaying at least a portion of the full test results at the display device coupled to the set top box.

2. The method of claim 1, further comprising: performing a root cause analysis at the set top box.

3. The method of claim 1, further comprising: transmitting a failed test message to the repair center when at least one self test fails.

4. The method of claim 3, further comprising: retrying a failed self test.

5. The method of claim 1, wherein the at least one self test includes: an IP layer connectivity test, a physical layer connectivity test, a network service function test, an STB service function test, a video stream receiving and decoding test, or a combination thereof.

6. The method of claim 1, further comprising: using the set top box to determine whether a fault is isolated based on the full test results.

7. The method of claim 1, wherein a server at the repair center determines whether a fault is isolated based on the full test results.

8. A method of troubleshooting a set top box, the method comprising:
   providing a trouble notice to a repair center from the set top box;
   providing instructions from the set top box to be displayed at a display device coupled to the set top box in association with the trouble notice being provided to the repair center, wherein the instructions comprise a sequence of key strokes to be entered by the user on a remote controller in communication with the set top box;
   performing at least one self test at the set top box when the sequence of key strokes is detected as being entered by the user at the remote controller;
   determining using the set top box, when a video service channel has network connection issues;
   transmitting from the set top box, full test results to the repair center for analysis by a technician, the full test results being transmitted from the set top box via a secondary wireless channel associated with the set top box when the at least one self test is completed and when the video service channel has network connection issues; and
   displaying at least a portion of the full test results at the display device coupled to the set top box.

9. The method of claim 8, comprising performing a root cause analysis at the set top box.

10. The method of claim 9, comprising:
    transmitting a failed test message to the repair center when the at least one self test fails;
    retrying a failed self test to obtain retry results; and
    transmitting partial test results comprising the retry results to the repair center.

11. The method of claim 8, wherein the at least one self test includes: an IP layer connectivity test, a physical layer connectivity test, a network service function test, an STB service function test, a video stream receiving and decoding test, or a combination thereof.

12. A method of troubleshooting a set top box, the method comprising:
    providing a trouble notice to a repair center from the set top box;
    providing instructions to be displayed at a display device coupled to the set top box in association with the trouble notice being provided to the repair center, wherein the instructions comprise a sequence of key strokes to be entered by the user on a remote controller in communication with the set top box;
    performing at least one self test at the set top box to generate test results when the sequence of key strokes is detected as being entered by the user at the remote controller;
    transmitting from the set top box, at least a portion of the test results to the repair center for analysis by a technician when the at least one self test is completed; and
    displaying at least a portion of the test results at the display device coupled to the set top box.

13. The method of claim 12, comprising:
    determining when all self-tests by the set top box have failed;
    providing a first notice to be displayed at the display device that further testing will be required; and
    providing a second notice to the repair center that further testing will be required.

14. The method of claim 12, wherein the at least a portion of the test results are transmitted to the repair center via a secondary wireless channel associated with the set top box.

15. The method of claim 14, comprising performing a root cause analysis at the set top box.

16. The method of claim 15, comprising transmitting a failed test message to the repair center when the at least one self test fails.

17. The method of claim 16, comprising retrying a failed self test.

18. The method of claim 17, wherein the at least one self test includes: an IP layer connectivity test, a physical layer connectivity test, a network service function test, an STB service function test, a video stream receiving and decoding test, or a combination thereof.

19. The method of claim 18, comprising using the set top box to determine whether a fault is isolated based on the test results.

20. The method of claim 12, wherein a server at the repair center determines whether a fault is isolated based on the test results.

* * * * *